Patented June 26, 1951

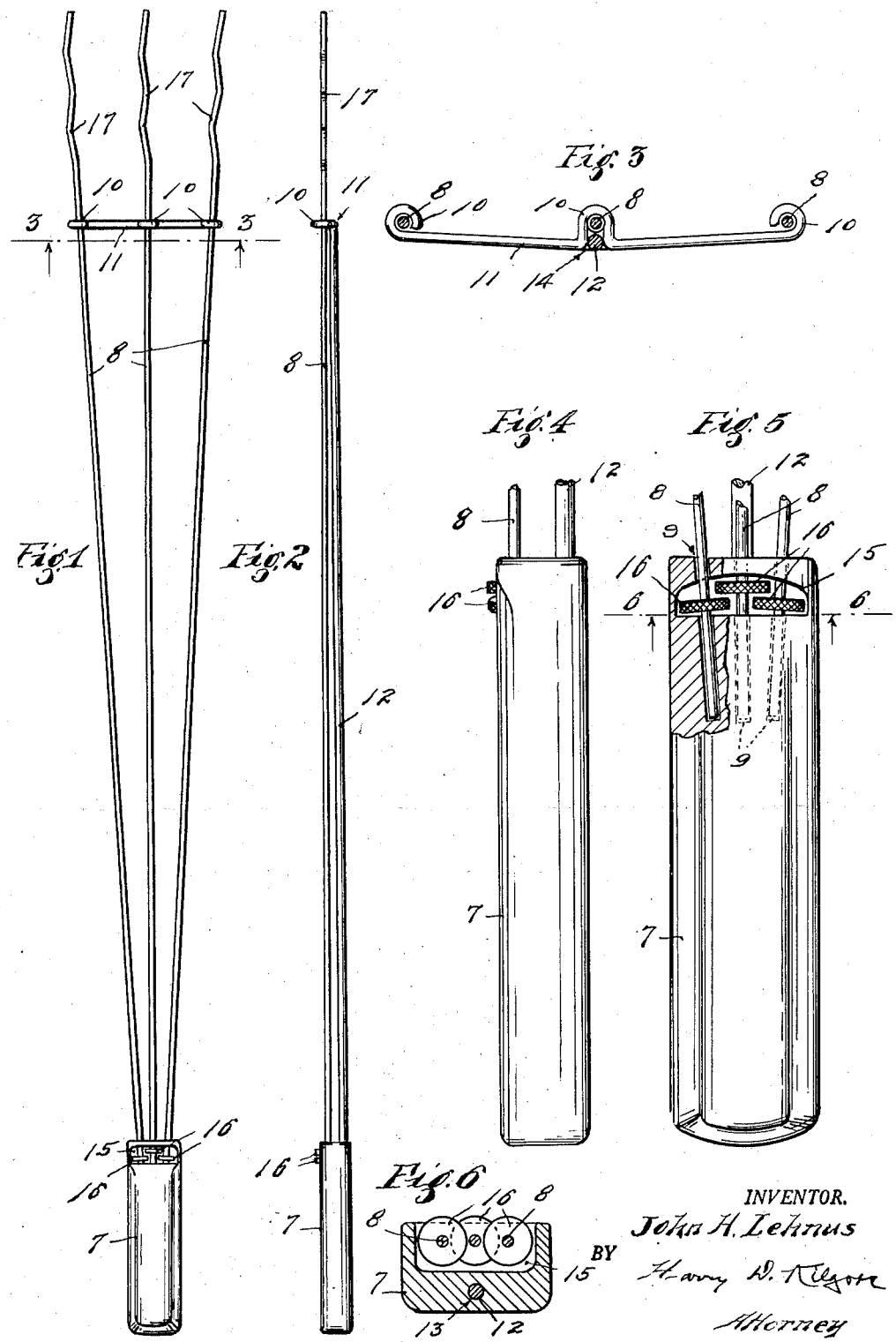

2,558,365

UNITED STATES PATENT OFFICE 2,558,365

ROASTING FORK

John H. Lehnus, Minneapolis, Minn., assignor to Robert E. Miller, St. Louis Park, Minn.

Application January 12, 1948, Serial No. 1,791

3 Claims. (Cl. 99—421)

My present invention relates to improvements in forks for use in holding foodstuffs and more particularly wieners while roasting or toasting the same over an open fire.

It is well known that it is necessary to turn a wiener and thus present a different side thereof to the fire in order to evenly roast the wiener without burning, and to thoroughly heat the same completely therethrough.

It is an object of this invention to provide a roasting fork comprising a handle and a long tine turnably mounted in the handle and having a wheel by which it may be turned simply by moving the thumb of the hand holding the handle over the periphery of the wheel, said wheel holding the tine against removal from the handle.

Another object of the invention is to provide a roasting fork comprising a handle and a plurality of long tines turnably mounted in the handle, each tine having individual wheels by which the tines may successively be turned simply by moving the thumb of the hand holding the handle over the peripheries of the wheels.

Still another object of the invention is to provide a roasting fork having a plurality of long tines with a novel support for holding the tines in diverging relation.

Other objects of this invention will be apparent from the following description, reference being had to the drawing.

Referring to the drawing:

Fig. 1 is a plan view of the improved roasting fork;

Fig. 2 is a side view of the same;

Fig. 3 is a detail view partly in elevation and partly in section taken on the line 3—3 of Fig. 1 on an enlarged scale;

Fig. 4 is a side view of the handle and fragments of one of the tines and the supporting rod;

Fig. 5 is a plan view of the handle shown in Fig. 4 with a portion thereof broken away and sectioned; and Fig. 6 is a view principally in section taken on the line 6—6 of Fig. 5.

The improved roasting fork includes an elongated flat handle 7 having rounded sides and three long tines 8 in the form of small round rods. These tines 8 are in the plane of the handle 7 and turnably mounted in bores 9 in the inner end portion of said handle. The two outer tines 8 are in diverging relation to the center tine 8.

The tines 8 near their outer end portions are turnably mounted in bearings 10 in a transverse rod 11 rigidly secured to the outer end of a round rod 12 rigidly secured in a bore 13 in the inner end portion of the handle 7. This rod 12 is heavier than the tines 8 and is directly below the center tine 8. The two outer bearings 10 are in the form of eyes in the outer ends of the rod 11 and the center bearing 10 is in the form of a yoke that straddles the rod 12 below the center tine 8 which extends therethrough and is rigidly secured thereto by welding 14.

In the upper side of the handle 7 close to the inner end thereof is a transverse cavity 15 through which the tines 8 extend. On each tine 8 is rigidly secured a wheel 16 having a knurled periphery. The wheels 16 on the two outer tines 8 are substantially aligned and the wheel 16 on the center tine 8 is outwardly thereof in close and overlapping arrangement. This center wheel 16 acts as a stop for the wheels 16 on the side tines 8 to prevent said side tines from being removed from their bores 9 and the end portion of the handle 7, outwardly of the cavity 15, acts as a stop for the center wheel 16 to prevent endwise removal of the respective tine 8 from its bore 9.

It is important to note that the peripheries of the wheels 16 project above the upper face of the handle 7 and independently and individually steps of rotary movement are imparted thereto to turn the tines 8 by a lateral movement of a person's thumb on the same hand that is holding the fork handle.

The free end portions of each tine 8 outwardly of the bearings 10 is crimped as indicated at 17 to hold a wiener that is pierced at its longitudinal axis by the respective tine 8.

Obviously by turning the wheels 16 as described, different sides of the wieners on the tines 8 will be successively and progressively presented to the fire and thus evenly roast the same thoroughly and heat the same completely therethrough.

From what has been said, it will be understood that the roasting fork described is capable of modifications as to details of construction within the scope of the invention herein disclosed and claimed.

What I claim is:

1. In a fork of the class described, a handle having a cavity, an intermediate bore and two outer bores in diverging relation, said bores extending through the cavity, long tines having one of their end portions turnably mounted in the bores, each tine having a wheel in the cavity by which it may be turned independent of the other tines, and a rod rigidly secured to the handle under the intermediate tine and having on its outer end a cross-member having a bearing in which the tines are turnably mounted.

2. In a fork of the class described, a handle having at its inner end portion a transverse cavity, an intermediate bore and two outer bores in diverging relation, said bores being in the inner end portion of the handle and extending through the cavity, long tines having one of their end portions turnably mounted in the bores, each tine having a wheel in the cavity, the wheels on the two outer tines being substantially aligned and the wheel on the intermediate tine being laterally offset from the other wheels in overlapping arrangement, said wheels affording stops to prevent removal of the tines from the handle, the peripheries of the wheels extending out of the cavity to be engaged by a lateral movement of a person's thumb on the hand holding the handle and thereby giving steps of independent turning movement, a rod rigidly secured to the handle under the intermediate tine having on its outer end a cross member provided with a bearing in which the tines are turnably mounted.

3. In a fork of the class described, a handle provided with a long supporting member, a transverse rod bent at its longitudinal center to form a yoke that straddles the supporting member at its outer end portion and rigidly secured thereto, the end portions of the transverse rod being bent to form eyes, three long tines in substantially the same plane journaled at their inner end portions in the inner end of the handle, the intermediate tine being journaled in the yoke and the outer tines being in diverging relation to the intermediate tine and journaled in said eyes, said tines projecting materially outwardly of the transverse member, and a wheel on each tine at the inner end of the handle, the wheels being in overlapping arrangement, whereby the tines may be successively turned by passing the thumb of the hand gripping the handle over the wheels.

JOHN H. LEHNUS.

REFERENCES CITED

The following references are of record in the file of this patent:

UNITED STATES PATENTS

| Number | Name | Date |
| --- | --- | --- |
| D. 28,446 | Richardson | Apr. 5, 1898 |
| 534,255 | Fleming | Feb. 19, 1895 |
| 1,869,299 | Bracht | July 26, 1932 |
| 2,004,659 | Groch | June 11, 1935 |
| 2,315,143 | Thompson | Mar. 30, 1943 |